United States Patent [19]

Kamas et al.

[11] Patent Number: 4,804,979

[45] Date of Patent: Feb. 14, 1989

[54] SINGLE-PASS COLOR PLOTTER

[75] Inventors: Peter Kamas, Sunnyvale; Douglas A. Hardy, Santa Clara; David M. Emmett, Palo Alto, all of Calif.

[73] Assignee: Benson, Inc., Palo Alto, Calif.

[21] Appl. No.: 107,844

[22] Filed: Oct. 6, 1987

Related U.S. Application Data

[63] Continuation of Ser. No. 722,497, Apr. 12, 1985, abandoned.

[51] Int. Cl.[4] .............................................. G01D 15/00

[52] U.S. Cl. ..................................... 346/157; 346/150

[58] Field of Search ................. 346/157, 136, 46, 150, 346/153.1, 195; 226/42, 44, 29–31, 112, 45; 242/184, 190, 188; 355/4; 101/DIG. 13; 400/114; 358/300, 78

[56] References Cited

U.S. PATENT DOCUMENTS

| | | | |
|---|---|---|---|
| 3,613,975 | 10/1971 | Knight | 226/42 |
| 4,007,489 | 2/1977 | Helmberger et al. | 346/157 |
| 4,011,976 | 3/1977 | Greek | 226/42 |
| 4,385,302 | 5/1983 | Mariguchi et al. | 346/46 |
| 4,401,024 | 8/1983 | Frentress | 346/157 |
| 4,419,679 | 12/1983 | Rutherford et al. | 346/157 |
| 4,569,584 | 2/1986 | St. John et al. | 346/157 |

FOREIGN PATENT DOCUMENTS

| | | | |
|---|---|---|---|
| 0110668 | 11/1983 | European Pat. Off. | 346/157 |

*Primary Examiner*—Arthur G. Evans
*Attorney, Agent, or Firm*—Theodore S. Park; Robert C. Colwell; Paul C. Haughey

[57] ABSTRACT

A printer/plotter incorporates four individual microprocessor-based print stations, each for printing on a print media a separate color image for superimposition with one another, forming a final full-color image. The four print stations are located along a transport path for single-pass operation, and each print station includes a transport system that allows the media to traverse a print station with controlled forces exerted on the media by that station. The invention further includes a precise registration system wherein each print station monitors registration marks to detect variations of the media (i.e., stretching or shrinkage) during the printing process and to correct for such variations on obtaining accurate registration of the individual images for a full-color result.

19 Claims, 2 Drawing Sheets

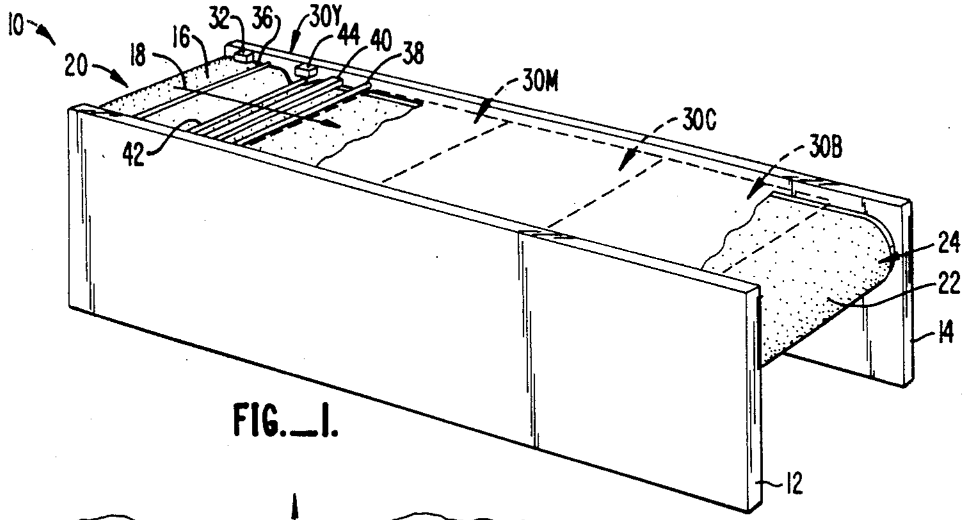
FIG._1.
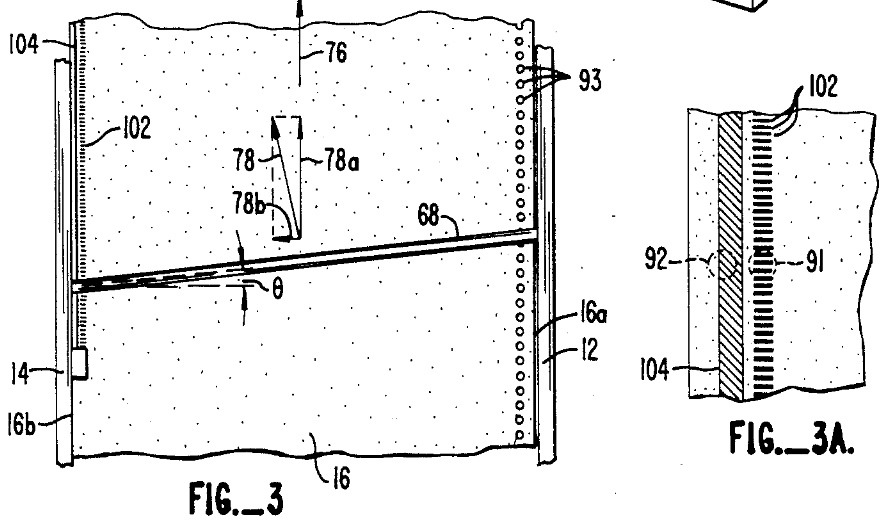
FIG._3
FIG._3A.
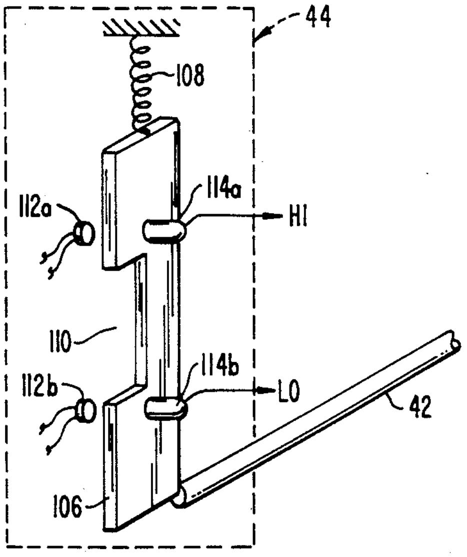
FIG._4.

SINGLE-PASS COLOR PLOTTER

This is a continuation of application Ser. No. 722,497, filed Apr. 12, 1985, now abandoned.

BACKGROUND OF THE INVENTION

This invention relates generally to electrostatic printing, and particularly to electrostatic color printing/plotting using multiple color print stations to produce a full-color image in a single-pass.

Electrostatic printing is accomplished by placing electrostatic charges in the form of the image to be printed on an electrographic media, usually paper. The paper is then exposed to a liquid toner to produce a permanent visible image. In electrostatic color printing, separate images are electrostatically printed on the paper and toner applied, each image typically corresponding to one of four colors: The three colors of yellow, cyan and magenta, and for true black, a fourth color of black.

Heretofore, some electrostatic color printers use a recording head containing an elongate arrangement of styli in combination with a back-plane of one form or another. Electrostatic printing paper is drawn between the recording head and styli while individual ones of the styli are selected and impressed with a voltage potential that, together with the back-plane (usually also impressed with a voltage potential) creates a "dot" of charge on the paper. The image for each color may be thought of as comprising lines or "rasters" of these dots which, when toned combine to form the image of that color. For full color, the yellow, magenta, cyan, and (if used) black images are separately printed, each registered to be relatively superimposed on one another to form the full-color image. Depending upon the final color desired, any particular dot location on the paper may have one or more colors printed thereat. Printing the full-color image has been performed by passing the paper through the print station (which usually has a single electrostatic recorder and multiple toner/dryers—one for each separate image) to print the first image, rewinding the paper and passing the paper through again for each subsequent image.

Among the problems associated with this technique of electrostatic color printing are the time required to complete the total image and maintaining the relative position of each successive image upon the paper relative all the primary images. As the paper is transported forward and backward through the print bed, proper registration of the individual images can be quite difficult. In addition, these problems are exacerbated by changes in the media caused, primarily, by humidity which, in turn, causes the paper to change size, both in the direction of travel and laterally.

Thus, the advantages of a color printer/plotter capable of printing a full-color image in a single-pass are certainly evident to those skilled in this art. The problems of time and registration are reduced, if not obviated, allowing precise full-color images to be printed, one after the other in a single-pass by print stations located in sequence along the transport path. Unfortunately, the drag forces imposed upon the paper by each print station, unless somehow compensated for, would ultimately be too great. Attempting to pull the paper through all print stations would require additional paper strength to prevent tearing. The paper becomes still, less flexible, and more expensive. Alternatively, merely adding additional drives between the print stations does not necessarily solve the problem—and can create other problems. Proper tension across the print head must be maintained within predetermined limits in order for the printing process to occur correctly. Adding extra paper drives can cause paper tension to be unacceptable at some of the print stations.

SUMMARY OF THE INVENTION

The present invention provides an electrostatic, single-pass printer/plotter capable of producing a full-color image from four separate, superimposed images (yellow, magenta, cyan, and black). Broadly, the invention includes a registration system that constrains one edge of the print media to a predetermined line of travel along a transport path to accurately guide the media therealong, and drive apparatus that, in addition to moving the media along the transport path, imparts a lateral force (i.e., directed away from the constrained edge). Thereby, any lateral change in media size is limited to a single lateral direction. A registration line is printed proximate the media edge opposite the constrained edge, as are equally spaced registration marks. Sensors, incorporated in each of a plurality of print stations (one for each separate color image) located along the transport path are optical sensors that monitor the registration line and mark to, under microprocessor control, modify the printing process to compensate for media variations in size. In short, the registration marks (which define each print line) and the registration line establish the position of every point on the media. Should media variations in size cause any of these points to vary their relative position, particularly if one of the images has been printed thereon, the relevant print stations can detect such variations and, knowing the direction of occurrence, make the necessary correction.

The invention further includes a transport drive system for each print station that, in addition to transporting the media through that station to the next print station, maintains a correct media tension and operates to eliminate any influence on the media by an immediately preceding or subsequent print station. The transport system includes a media drive located at the output of each print station that is separately controllable (relative to the other print stations) in cooperation with adjacent print stations to adjust a path along which the media travels within the print station to maintain media tension.

According to the preferred embodiment of the invention, a support defines a transport path along which are mounted four individual print stations. Each print station is adapted to receive data for printing a separate color image for superposition with color images printed by the other print stations.

A registration system includes precision, free-wheeling sprocketed rollers located along the transport path to operably engage sprocket holes formed along one edge of the media, which is, in the embodiment described an electrostatic paper. The sprockets function to constrain the edge as the paper moves along the transport path, providing an accurate alignment of the paper. Proximate the opposing edge of the paper are placed registration marks and a registration line. Each print station is provided with optical sensors that monitor the registration marks to synchronize the printing operation with each mark, and to monitor the alignment strip.

The transport system used to move the paper from print station to print station uses five separately controlled drive rollers. One, located near an entry area of the transport path, pulls the paper from a roll onto the transport path and through the print station that marks the paper with the registration line and marks, and feeds the paper to a first of the four print stations. In addition, each print station has a drive roller to pull the paper through that station and supply it to the next successive print station (or, in the case of the final print station, to the output of the transport path).

All drive rollers of the transport system are skewed a slight amount, relative to the direction of travel of the paper, to impart to the paper a small force (on the order of 0.1 oz.) in a direction transverse the direction of travel, and away from the constrained edge. This serves two important purposes: First, it ensures that any lateral paper variations are in one direction only—away from the constrained edge (and toward the edge carrying the registration line). The amount of lateral variation is detected by the optical sensor of each print station that monitors the registration line, and the microprocessor of that print station can modify the data sent to the print head to obtain proper correction for variation. Second, the paper is pulled against the sprockets to accurately align the paper with, and guide the paper along, the transport path.

Each of the print stations includes at the exit thereof, one of the drive rollers of the transport system. Preceding each (exit) drive roller of each print station is an electrostatic print head and back plane combination toner station, and a tension bar that assists in maintaining the force with which the paper is drawn across the print head within predetermined limits. A microprocessor, also included in each print station, responds to signals indicative of paper tension within the print station to separately operate the print stations drive roller relative to the other drive rollers to control paper tension within the print station. In this manner the drag force imparted to the paper by the print station is accurately maintained and controlled as needed for paper print operation.

A number of advantages are obtained by the present invention. First, by providing the capability of single-pass, full-color print/plot operation, the time required for the final image is reduced. Further, the printing/plotting procedure can be varied to accommodate data flow from the source (i.e., computer or the like) supplying image data and the complexity of the image being printed by any one print station. For example, the data to be printed could be supplied from a main frame computer, and the data flow may vary. The printing speed can be varied (within limits of the printer itself) to accommodate such data flow variations on a real time basis.

The registration system employed by the present invention allows each print station to calculate exactly where any particular point on the paper is located, despite media variations, allowing accurate placement and registration of the separate images printed on the paper. Additionally, constraining one edge of the paper to a specific line of travel, together with applying a small lateral force to the print media, away from the constrained edge, accurately aligns and guides the media along the transport path and through the print stations.

Additionally, by providing each print station with a drive roller that is independently variable, and by monitoring the tension of the media (i.e., paper) within the print station, the tension of the paper across the print head can be accurately controlled. In addition, the overall drag imposed by the print station can be kept to a predetermined minimum, thereby allowing a plurality of print stations to be sequentially placed along a transport path for producing single-pass full-color printing/plotting.

These and other advantages will become evident to those skilled in this art upon a reading of the following detailed description, which should be made with reference to the accompanying drawings.

BRIEF DESCRIPTION OF THE DRAWINGS

FIG. 1 is a perspective view of a single-pass, full-color, electrostatic printer/plotter constructed in accordance with the teachings of the present invention;

FIG. 3 is a representation of a portion of the print media, e.g., electrostatic printer paper used, for printing images by the present invention, illustrating placement of the apertures at one edge of the paper, and the registration marks and registration line placed at the opposing edge thereof; also illustrated in FIG. 3 is the skewing of a drive roller to impart a lateral force to the paper;

FIG. 3A is an amplified view of the registration marks and registration line placed proximate one edge of the printer paper, and illustrating sensor locations relative thereto; and FIG. 4 is a representation of the shuttered optical sensor used to detect tension of the media transported through each print station of FIG. 2.

DETAILED DESCRIPTION OF THE INVENTION

Figure 2:
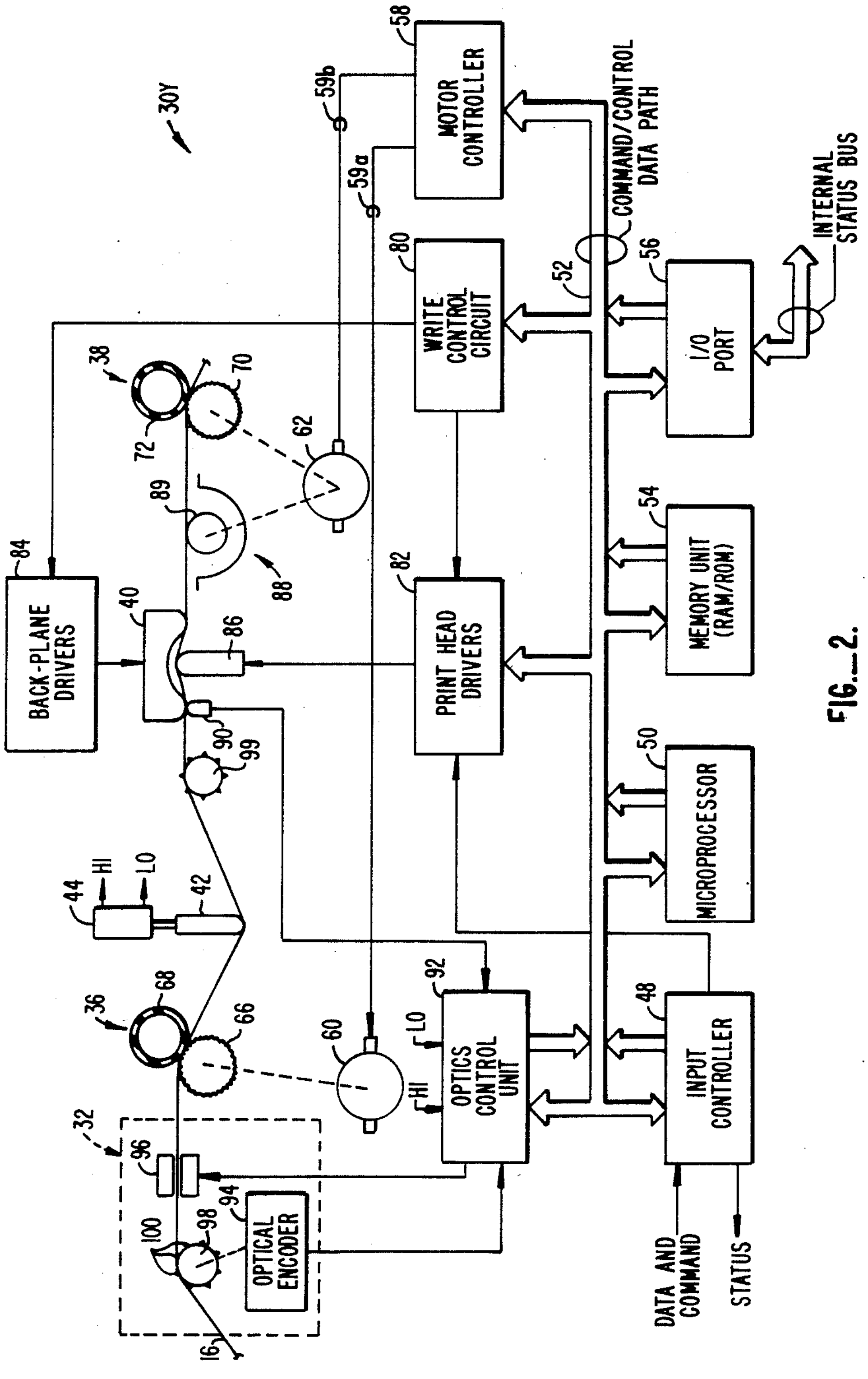
FIG. 2 is a block diagram representation of one of the four print stations used in connection with the present invention.

Referring to FIG. 1, a printer/plotter constructed in accordance with the teachings of the present invention, and designated generally with the reference numeral 10, is illustrated. The printer/plotter 10 includes a pair of side plates 12 and 14, mounted in generally fixed, spaced and parallel relation to one another by appropriate mean (not shown). The side plates 12 and 14 generally define, at the upper portion thereof, a transport path 18 along which the media 16 (such as, for example, electrostatic paper) travels from a paper supply roll (not shown), located proximate an entry area 20 of the transport path 18, to a take-up roll 22, located at an exit area 24 of the transport path. At spaced locations along the transport path 18 are four print stations 30Y, 30M, 30C and 30B, each respectively structured to print an image in the separate colors of yellow, magenta, cyan, and black.

Proximate the entry area 20 of the transport path 18, and mounted to the side plate 14, is a marker station 32, which functions to print registration indicia along one edge of the paper 16 as it enters the transport path 18. As will be seen, the registration indicia, comprising a registration line and spaced markers (104 and 102, respectively, FIGS. 3 and 3A) are used to track any variations in paper size as the paper moves along the transport path. The print stations 30Y, 30M, 30C and 30B, as will be described more fully below, are each equipped to sense any such variations and adjust the print operation to compensate. Each of the print stations 30Y, 30M, 30C and 30B operate independently to electrostatically print their corresponding yellow, magenta, cyan or black images on the paper 16 in registered relation to one another by monitoring the registration indicia.

FIG. 1 illustrates the print station 30Y being preceded by an entry drive 36, which functions to pull paper from the paper supply roll (not shown) onto the transport path 18 and through the marker station 32, feeding the paper to the print station 30Y. The print station 30Y includes an exit drive 38 to pull the paper through the print station, and, preceding the exit drive 38 is a back-plane 40, and a tension bar 42. Tension bar 42 is coupled to a detector 44 for determining the depth of the tension bar 42, obtaining thereby an indication of the tension of the paper 16 between the entry and exit drives 36 and 38.

The print stations 30Y, 30M, 30C and 30B are identically structured, so that hereinafter only the print station 30Y will be described. It should be understood, therefore, that any description of the print station 30Y will apply equally to the print stations 30M, 30C and 30B—unless otherwise noted. Further, the individual print stations 30Y–30B use an electrostatic print process generally of the type that employs a printer head that extends between the side plates 12 and 14 (and underlies the back-plane bar 40 of FIG. 1) and comprises an elongate array of staggered rows of styli. The print heads, and the electronics to operate the print heads, are described in U.S. Pat. No. 4,419,679, the contents of which are hereby incorporated by reference, and the documents referred therein, entitled "Service and Maintenance Manual", published in April, 1981 by Benson-Varian of 2690 Orchard Park Way, San Jose, Calif. 95152-2059, Model 9424 Printer/Plotter, Publication No. 03996-336E. Only the novel features of each print station, as they apply to the present invention, are described herein.

FIG. 2 illustrates, in greater detail, the marker station 32, the entry drive 36, and the configuration of the print station 30Y. As FIG. 2 shows, data and command information is supplied from a source of data to the print station 30Y and received by an input controller 48, which functions as an intelligent buffer for the information to be printed. Status information respecting operation of the print station 30Y is generated by a microprocessor 50, and is communicated to the input controller 48 via a command/control data path 52, and made available for transmission to a data source (not shown) by the input controller 48.

The data path 52 connects the microprocessor 50 to a memory unit 54, which includes both random access memory (RAM) and read-only memory (ROM). The memory unit 54 contains the necessary programming to operate the microprocessor 50 to effect control over printing operations performed by the print station 30Y. An input/output (I/O) port 56 provides a buffered input/output data path between the print stations 30Y, 30M, 30C and 30B. Status information such as, for example, adjustment of the tension, is transmitted via the I/O port 56 between the various print stations to coordinate paper flow therethrough.

Also coupled to the command/control data path 52 is a motor controller 58 which, in turn, is connected to micro-stepper motors 60 and 62. In response to command data from the microprocessor 50, in the form of a count specifying the number of micro-steps to be taken by one or the other (or both) of the micro-stepper motors 60, 62, the motor controller 58 controls operation of the micro-stepper motors 60 and 62. By issuing pulses on one or the other (or both for synchronous operation) of the signal lines 59*a* and 59*b*, the motor controller 58 causes the micro-stepper motors 60 and 62 to take the required number of micro-steps (one for each pulse) individually, together at different rates, or together in synchronism.

The micro-stepper motor 60 operatively connects to drive roller 66 that, together with a pinch roller 68, form the entry drive 36 (FIG. 1) to grip and pull the paper 16 into the print station 30Y. The drive roller 66 is provided with a knurled surface, and the pinch roller 68 is coated with an elastomeric material, together forming a combination that extends between side plates 12 and 14 (FIG. 1) to grip the paper 16 therebetween to pull the paper into the print station 30Y or hold the paper fixed, as the case may be.

In similar fashion, the micro-stepper motor 62 connects to and powers the exit drive 38, also comprising a knurled drive roller 70 and an elastomeric coated pinch roller 72.

The drive rollers 66 and 70, as well as pinch rollers 68 and 72, are all aligned in substantially parallel relation to one another, but skewed slightly relative to the direction of paper travel, as illustrated in FIG. 3. FIG. 3 shows the pinch roller 68 mounted between the side plates 12 and 14 and skewed an angle $\theta$ relative to the direction of travel (arrow 76) of the paper 16 along the transport path 18. In the preferred embodiment of the invention the angle $\theta$ of skew is approximately 0.072°. Since the companion drive roller 66 (which would generally underlie the pinch roller 66, but is not seen in FIG. 3 because it is obscured by the paper 16), and the drive and pinch rollers 70 and 72, respectively, are parallel to the pinch roller 66, they also are skewed the same angle $\theta$. This slight skew of the entry and exit drives 36 and 38 imparts a force vector 78 (FIG. 3) to the paper 16, when moving the paper, with a major component 78*a*, but a lesser component 78*b* (approximately 0.1 oz.).

As FIG. 3 also illustrates, the paper 16 is perforated proximate one edge 16*a*. The print station 30Y is provided with a sprocketed roller 99 (FIG. 2) that is journalled to extend between side plates 12 and 14. The sprockets are located proximate the end journalled to side plate 12 to operatively engage the apertures 93 (FIG. 3) formed in the paper. In addition, an identical sprocketed roller 98 (FIG. 2) is located proximate the entry 20 of the transport path 18.

The five sprocket rollers (sprocketed roller 98, and the sprocketed rollers 99 in each of the print stations 30Y–30B) cooperatively operate with the apertures 93 to constrain the edge 16*a* in a line along the transport path 18. This constraint operates with the skewing of the entry and exit drives 36 and 38 to limit any size variation of the paper 16 to two directions only: One in the direction of travel, and one in a transverse direction. Knowing which way paper size varies allows one to more accurately detect, and compensate for, such variations. The preferred detection and compensation is discussed further hereinafter.

The sprocket/paper aperture combination also accurately align and guide the paper along the transport path. The forward and lateral forces imparted to the paper 16 by the drive rollers pull the paper against the sprockets, accurately aligning the paper as it travels through each print station and, in particular, just prior to entering the print head/back-plane 86/40 combination. In the preferred embodiment, the teeth of the sprockets are 0.103±0.001 inches; the paper 16 is perforated with apertures 0.104±0.001 inches in diameter, set 0.250±0.001 apart (center-to-center).

Returning to FIG. 2, the microprocessor 50 also communicates via the command/control data path 52 with a write control circuit 80 which, in response to instructions from the microprocessor 50, controls the write operation via print head drivers 82 and back-plane drivers 84. The print head drivers 82 are connected to an electrostatic print head 86. The electrostatic print head 86 is, as indicated above, an elongate array of individual styli (not shown) held by a matrix of epoxy and positioned beneath the back-plane bar 40 (FIGS. 1 and 2). In response to signals from the write control circuit 80, and the microprocessor 50, the print head drivers 82 and back-plane drivers 84 function to produce, between individual selected ones of the styli (not shown) of the electrostatic print head 86 and the back-plane 40, approximately a 600-volt potential to produce electrostatic charges on the paper 16.

Located downstream of the print head 86-back-plane 80 combination is a toner station 88. It is here that toner (for print station 30Y—yellow; for print stations 30M, 30C and 30B—magenta, cyan and black, respectively) is applied to the electrostatically charged paper (adhering only to the charged area), dried, and any residual charge neutralized. The toning roller 89 of the toner station 88 is driven by the stepper motor 62 to apply the liquid toner to the charged paper. The printing process used by the present invention is known to those skilled in the art, except as to the construction and operation of the electrostatic printing head 86, in which case resort should be had to the above-referenced U.S. Pat. No. 4,419,679 for further information.

Located upstream and proximate the electrostatic print head 86 is an optical sensor array 90, comprising a pair of optical sensors (not shown, but whose locations are indicated in FIG. 3A at 91 and 92 by the dotted circles) that are used to detect and track the registration marks placed on an edge of the paper 16 by the marker station 32 (FIGS. 1 and 2). The marker station 32 comprises a small electrostatic registration print station 96 (including toning and drying apparatus) for printing the registration indicia on the paper 16. As FIGS. 3 and 3A illustrate, the registration indicia, consisting of registration marks 102 and line 104, is placed proximate the edge **16*b*—opposite the constrained edge 16*a*. The registration line and marks 104, 102 are printed on the downward-facing surface of the paper 16**.

The registration marks 102 define the portion of each line of dots to be printed at each of the print stations 30Y–30B. Between each registration mark 102—that is from leading edge to leading edge—are 50 raster lines (i.e., lines of dots) across the paper 16, and 800 microsteps of the micro-stepper motors 60 and 62. The printing of each registration mark 102 is keyed to rotation of the sprocketed roller 98. As the paper 16 travels along the transport path 18, the apertures 92 capture and rotate the sprocketed roller 98. An optical encoder 94 is coupled to the sprocketed roller 98 to produce timing signals indicative of rotation. These timing signals are conveyed to the registration print station 96, via the optics control unit 93, to cause a registration mark 102 to be printed on the paper 16. Thus, in addition to functioning to constraining the edge **16*a* of the paper 16 at that point, the sprocketed roller 94 sees to it that registration marks are accurately spaced on the paper 16—independent of paper velocity. The print stations 30Y–30B** can rely on the registration marks to determine if any variation in size of the paper, in the direction of travel, has occurred, and act accordingly to compensate for any such variation.

Similarly, the registration line 104 establishes a transverse dimension of the paper 16 as it enters the transport path. Detected variations of the registration line 104 at the print stations 30Y–30B allow the print stations to signal the print process to compensate in a manner discussed further below. It is the function of the optical sensor array 90 to detect these variations, if any. As indicated above, the registration marks 102 so placed on the paper 16 correspond to the start of a print line formed by the print head 86. The markers are read by the optical sensor array 90, and used to accurately position the lines of print data at the print station 30Y and at each print station 30M–30B relative to any preceding print station.

In order to achieve proper printing/plotting of the color images by each of the print stations 30Y–30B, the tension of the paper 16 while in the print station 30Y (i.e., while between the entry and exit drives 36 and 38) must be correctly maintained so that it is pulled across the drive head 86 and back-plane 40 in a proper manner. Too much tension will create too much wear of the head 86, too little paper tension impairs the print operation. In addition, each print station must see to it that it imposes a predetermined minimum drag force on the paper 16. Otherwise, the problem of paper tears and poor plotting/printing become very real. To alleviate these problems, separate control of the micro-stepper motors 60 and 62 is possible (and, correspondingly, separate control of the microstepper motors of print stations 30M, 30C, and 30B, corresponding to micro-stepper motor 62). Thus, for example, to increase paper tension within the print station 30Y, the micro-stepper motor 60 can be slowed down, relative to the micro-stepper motor 62, to slow down the paper being fed into the print station 30Y. At the same time, operation of the micro-stepper motor 62 is continued or speeded up to cause the exit drive 38 to continue to pull the paper 16 from the print station 30Y but at a faster rate —until the desired paper tension is obtained, at which time both micro-stepper motors 60 and 62 can be synchronously operated.

If the speed of micro-stepper motor 62 is increased, the transport system downstream thereof must adjust accordingly. Thus, the microprocessor 50 places status data on the Internal Status Bus via the I/O port 56 that is communicated to the downstream print stations 30M, 30C, and 30Y. They, in turn, will adjust the speed of their micro-stepper motors 62 to take up the slack.

Proper tension of the paper within the print station 30Y is monitored by the tension bar 42. But the tension bar 42 performs a variety of additional functions: First, it operates to maintain a paper path of predetermined length between the upstream entry drive 36 and the downstream exit drive 38; second, it operates to straighten the paper as it is fed from the upstream entry drive 36 into the print station 30Y (the skewed rollers tend to cause the paper to buckle or wrinkle somewhat); third, it operates to ensure that the constrained edge **16*a* properly engages the sprocketed roller 99 to align the paper just before it is pulled across the electrostatic print head 86; and fourth, the vertical position of the bias bar can vary to compensate for disparities between the micro-stepper motors 60 and 62**.

Thus, while indeed it is tension that the tension bar 42 monitors, it may be more accurate to say that what really is being monitored is the force exerted on the print head 86. If this paper path shortens, it is an indication that the paper is tightening, imposing higher forces on the print head 86 and possibly causing a deterioration in print/plot quality. In any event, the vertical position of the tension bar 42 is monitored by a shuttered optical detector 44 to which the tension bar 42 is connected. Two signals are produced by the optical detector 44: A HI signal that indicates when the tension bar 42 has been moved by a shortening of the paper path to its vertically upward extreme; and a LO signal to indicate that an extension of the paper path has released the tension bar 42 to its extreme low position. Absence of both the HI and LO signals indicate the tension bar 42 is in a median range and that the paper path is within an acceptable range.

The shuttered optical detector 44, used to monitor the position of the tension bar 42, is illustrated in greater detail in FIG. 4. As shown, the detector 44 includes a planar shutter 106 mounted in the detector 44 in a vertical orientation. The shutter 106, so mounted, is capable of vertical movement with the tension bar 42 which is biased downward by, for example, a spring 106 that exerts approximately a two-pound force thereon at the end connected to the shutter 106. An equal bias force is applied to the opposite end of the tension bar 2 in order to exert an equal force against the paper 16 along the length of the tension bar.

The shutter 106 is apertured at 110 to, depending upon the relative vertical position of the shutter 106 and the aperture 110, allow light communication between one or the other light sources **112*a*, 112*b* and their corresponding optical sensors 114*a*, 114*b*, respectively. Optical communication between the light source/optical sensors 112*a*/114*a* and 112*b*/114*b*** produces the HI and LO signals, respectively; no communication, no signals.

Preferably, the paper is tensioned in print station 30Y so that a force of approximately two pounds is exerted on the paper 16 (in the plane of the paper) at the input of the head/back plane combination 40/86, and five pounds at the output. It is one function of the tension bar 42 to maintain a paper path through the print station 30Y so that the paper 16 is drawn properly, and with the correct force, across the print head 86. The range within which the paper path can vary is established by the limits of vertical travel of the tension bar 42, as measured by the optical shuttered detector 44. The HI and LO signals, therefore, provide indicia of the lengthening or shortening of the paper path, in the form of paper tension, so that the microprocessor 50, via the motor control 58, can independently control the micro-stepper motors 60 and 62, and with them the drive rollers 66 and 70, to maintain the desired paper path length. This is accomplished in the following manner: Assume, at the outset, that the paper 16 has just been installed in the print station 30Y (as well as the following print stations 30M, 30C and 30B). At the initiation of operation, the paper will have very little tension, indicating that the path of the paper 16 in print station 30Y is too long for proper print operation. The tension bar 42, therefore, will be allowed by the paper 16 to drop to its lower extreme, positioning the aperture 110 of the shutter 106 (FIG. 4) so that optical communication is established between the light source **112*b* and its corresponding optical sensor 114*b*. The LO signal becomes active, indicating to the microprocessor 50, via the optics control unit 92 and command/control data path 52, that little or no tension is present on the paper 16 and that the paper path must be shortened. Accordingly, the microprocessor 50 will issue commands (i.e., a micro-step count) to the motor controller 58 to begin operation of the micro-stepper motor 62 while, at the same time, holding the micro-stepper motor 60** fixed.

The number of micro-steps that a micro-stepper motor must take to move the tension bar from its low limit to its high limit is known; in the preferred embodiment this number is approximately 6,000 micro-steps. Accordingly, the microprocessor program knows that from the point the LO signal terminates there will be approximately 3,000 micro-steps required by the micro-stepper motor 62 to position the tension bar 42 midway its limits.

Thus, the microprocessor 50 will issue commands (counts) to the motor controller 58 to cause the micro-stepper motor 62 to set through approximately 3,000 micro-steps while holding the micro-stepper motor 60 inactive. With the paper held fixed between the drive rollers 66 and pinch roller 68, the drive roller 70 begins pulling the paper 16 to shorten the paper path in the print station 30Y and thereby increase paper tension, moving the tension bar 42 until the micro-stepper motor 62 makes its approximately 3,000 steps.

This paper-tightening operation also takes place in the remaining print stations 30M, 30C and 30B so that, when complete, the path of the paper 16 in each print station is the desired length and the paper properly tensioned. However, the tightening operation is somewhat different—only because the print stations 30M, 30C, and 30B directly control only one micro-stepper motor—the one corresponding the micro-stepper motor 62 of the print stations exit drive 38. Print station 30Y is the only one having direct microprocessor control over two micro-stepper motors; control over what would correspond to the micro-stepper motor 60 for print stations 30M, 30C, and 30B is exercised by the microprocessor immediately preceding the print station. For example, paper tightening in the downstream print station 30M will be identical to that described above, except that the microprocessor 50 of print station 30Y will control its micro-stepper 62 at the exit station 38 to hold the paper 16 fixed while the corresponding microprocessor 50 of print station 30M will control its corresponding micro-stepper motor 62 to shorten the paper path therein. (Remember, the entry drive 36 for print stations 30M, 30C, and 30B are also the exit drives 38 of print stations 30Y, 30M, and 30C, respectively.) This requires communication between the respective microprocessors 50 of the print stations 30Y and 30M so that their efforts are synchronized as described. This communication is made between the microprocessors 50 via the I/O ports 56 (of each print station 30Y and 30M) and the Internal Status Bus. This paper tightening procedure is substantially identical for print stations 30C and 30B, except that it should be evident that all upstream print stations are involved in the paper-tightening operation of any particular downstream print station.

In addition to tensioning the paper at the outset, the HI and LO signals from the optical detector 44 also allow the microprocessor 50 to readjust tension at any of the print stations 30Y–30B, independent of the others, during print operations. For example, assume that the paper is moving at a constant speed through the print station and that, for whatever reason, the paper path at the print station 30Y (FIG. 2) has decreased.

This decrease, or shortening, of the paper path causes the tension bar 42 to be moved upward against the bias spring 108 (FIG. 4). Ultimately, the paper path will shorten, moving tension bar 42 so that the aperture 110 in the shutter 106 of the optical detector 44 is positioned to allow light communication between the light source 112*a* and the optical sensor 114*a*. Thereby, the HI signal is active, and communicated to the microprocessor via the optics control unit 92 and the command/control data path 52. This will cause the microprocessor 50 to issue commands to the motor controller 58 to (1) slow down operation of the microstepper motor 62 while (2) continuing operation of the micro-stepper motor 60 at a slightly higher rate. Thus, the micro-stepper motor 62 will operate at a slightly lower rate of micro-steps per second than before; the micro-stepper motor 60 will, at the same time, operate at a slightly higher rate of micro-steps than before; and, since the paper 16 is being fed into the print station 30Y at a faster rate than it leaves, the paper path lengthens in a smooth, continuous fashion. While the micro-stepper motors 60 and 62 are operated at these different rates, the microprocessor 50 keeps a running accumulation of the excess micro-steps taken by the micro-stepper motor 60 relative to the micro-stepper motor 60. When this excess totals approximately 3000, the microprocessor 50 will terminate running the microstepper motors 60 and 62, and begin operating them at the same rate, thereby terminating this paper path lengthening procedure.

The procedure is somewhat different for downstream print stations 30M, 30C, and 30B. For example, if it is the print station 30B that experiences a shortened paper path, all upstream print stations 30Y, 30M, and 30C must increase their respective paper transport rates while the microprocessor 50 of the print station 30B slows its micro-stepper motor 62. Coordination of this procedure is established between the respective microprocessors 50 of the print stations 30Y–30B by communication of status information (i.e., micro-stepper motor rates) on the Internal Status Bus.

The actual size of the paper, both laterally and in the direction of travel along the transport path 18, can change—primarily due to humidity differences to which the paper was subjected when rolled and unrolled. Changes in the direction of travel are measured by detecting the timing marks 102 at each of the print stations 30Y–30B by the optical sensor group 90. The optical sensor group, as indicated in FIG. 5A comprises two independent sensors (indicated, in FIG. 5A in dotted line) 118 and 120. The sensor 118 monitors the registration marks 102, providing a signal every 50 raster lines (i.e., lines of printed dots) at the detection of each mark to the microprocessor 50 via the optical control unit 92 and command/control data path 52. The microprocessor 50 then functions to register the write operation with the registration mark. If, due to variations in paper length along the direction of travel, the registration mark has not yet appeared, or alternatively has appeared earlier than the 16 micro-steps allotted between raster lines, the microprocessor 50 coordinates the write operation accordingly, and resets the motor controller 58. In this manner, the lines of (yellow) image printed by the print station 30Y can be registered accurately, relative to the registration marks 102, so that a printed yellow "dot" can be superimposed (either in overlapping or side-by-side relation) with a magenta dot at print station 30M, a cyan dot at print station 30C, a black dot at print station 30B, or any combination thereof, to produce the desired color. The registration is checked by each print station 30Y–30B every 50 raster lines and brought back into exact registration if necessary.

If the media, i.e., paper 16, experiences a lateral change in size, this change will be in one direction only as a result of the skewing of the drive rollers, as explained above, with reference to FIG. 3. Any change will be detected by the optical sensor 120 which produces an analog voltage varied by the black strip relative to the white background of the paper that is communicated to the optics control unit 92. There, the analog voltage is converted to digital information via a conventional digital-to-analog converter (not shown) that is conveyed to the microprocessor 50 on the command/control data path 52.

Paper can stretch, in the lateral direction, as much as 3–5 dot positions (each "dot" being approximately 1/254 of an inch). Thus, for example, if a particular dot is printed by the print station 30Y and is to have a magenta dot superimposed thereon, the print station 30M for placing the magenta dot must know the X, Y location of that yellow dot. This information is provided both by the registration marks 102 and the registration line 104. Registration marks 102, when counted by the microprocessor 50, determine exactly which line contains the yellow dot of our example, and the signal produced by the optical sensor 120 provides information as to whether that dot position has shifted away from the edge 16*a* (FIG. 3) of the paper that has been constrained. Accordingly, when that particular line is to be printed by the print station 30M, the microprocessor 50 can act on the dot information applied to the print head drivers 82 accordingly, adding or subtracting dots to superimpose the proper magenta dot printed by the print station 30M over the yellow dot previously printed by the print station 30Y.

In summary, there has been disclosed a single-pass full-color plotter/printer, among the significant features of which are (1) monitoring and adjusting the paper path and paper tension independently within each of the four color print stations, thereby keeping the tension forces imposed on the paper by each print station at a predetermined state; (2) maintaining the registration of each image produced by each color station relative to those images produced by the others. This latter aspect is achieved, in part, by ensuring that lateral changes in the print media (i.e., paper) are in a single direction, and by using registration marks that determine, relative to the paper, the placement of each print line and each dot in that print line, thereby allowing microprocessor compensation "on the fly" for media variations; and (3) guide and monitor the exact position of the media (e.g., print paper) with sprocketed rollers and apertured media together with transport drive apparatus, including the tension bars 42, to accurately locate the media to the sprockets. These features combine to provide a printer/plotter that generates, in a single pass, a full color image from a number of individual, superimposed, accurately registered monochrome images each printed by separate print stations independent of velocity.

Although a preferred embodiment of the present invention has been described, those skilled in the art will recognize that other embodiments are capable of being implemented based upon the principles of this invention. For example, according to the above disclosure, each individual print station 30Y, 30M, 30C and 30B are provided with a separate microprocessor. Other embodiments may incorporate the teachings of the present invention using a single microprocessor to control all four print stations, thereby obviating much of the data communications therebetween via the internal status bus 56. Therefore, the above description should not be taken as limiting the present invention, the scope of which is defined by the appended claims.

We claim:

1. Transport apparatus for a printer/plotter having plural print heads arranged successively along a transport path for single-pass printing of an image on a print media, said transport apparatus comprising:

a plurality of separately controllable drive means for moving the print media along the transport path while maintaining media tension, a first one of said drive means being positioned at an input location of a first one of said print heads, the remaining ones of said drive means being positioned at an output location of each print head, said first drive means being operable as an entry drive for the first print head, a last one of said drive means being operable as an exit drive for a last one of said print heads, the remaining ones of said drive means simultaneously being operable as an exit drive of an immediately preceding print head and as an entry drive of an immediately succeeding print head;

a plurality of tension monitoring means, each engageable with the print media, for providing a tension signal indicative of the print media tension as the print media moves between said drive means; and control means, coupled to each said drive means, for providing drive signals in response to receipt of the tension signals to maintain print media tension within a predetermined range between each said drive means.

2. The transport apparatus of claim 1, wherein the drive means include an elongate drive roller and an elongate pinch roller positioned in parallel relation to one another with the print media therebetween in gripping relation.

3. The transport apparatus of claim 2, and wherein the drive means each includes a microstepper motor operable in response to the control means to drive the drive roller.

4. The transport apparatus of claim 1, and wherein the drive means each includes a microstepper motor operable in response to the control means.

5. The transport apparatus of claim 1, and wherein the tension monitor means includes an element and means for movably biasing the element in engagement with the print media as the print media moves through the print station, and means coupled to the element to provide said signal as a function of positional movement of the element.

6. Transport apparatus for a single-pass printer/plotter for printing of an image on a print media, the transport apparatus comprising:

means for defining a transport path along which the print media travels;

means, mounted to the transport path, for constraining one periphery of the print media along a predetermined line of travel of the transport path; and drive means for moving the media along the transport path by imparting a first force to the print media in the direction of media travel while imparting a second force in a direction generally transverse the direction of media travel, parallel the media surface, and away from the constrained periphery.

7. A single-pass color printer for imprinting color images on a media by superimposing a plurality of individual images one upon the other, comprising:

support means defining a transport path for movement of the media therealong;

a plurality of print stations mounted in sequential order along the transport path, each print station being operable to print a corresponding one of the individual images; and transport means for moving the media from an entry to the transport path to an exit of the transport path through each of the print stations, the transport means including a first drive means mounted to the transport path upstream of the print stations and, for each print station, a second drive means mounted to pull the media through the corresponding print station, means for sensing a media path length within each print station, the media path length being variable within a predetermined range, and control means for each print station for controlling the velocity with which the immediately preceding first or second drive means provides the media to the print station relative to the second drive means of the print station.

8. The single-pass color printer of claim 7, and including a marker station for imprinting sequential registration marks on the media for establishing predetermined positional relation between the registration marks and the media; and wherein each of the print station includes sensing means for detecting said registration marks and means for registering the image printed by the print station to the registration marks.

9. The single-pass color printer of claim 7, wherein the transport means includes means for sensing variations of the media path length within each print station.

10. The single-pass color printer of claim 9, wherein the transport means includes means for sensing the variations of the media path length and for adjusting the media path length to a predetermined nominal length.

11. The single-pass color printer of claim 7, wherein the media includes a substantially linear edge the transport means including means for constraining the media edge to a predetermined line of travel along the transport path.

12. The single-pass color printer of claim 11, the media having a plurality of spaced-apart apertures proximate the media edge and wherein the constraining means includes a plurality of sprocketed means mounted to the support means at spaced locations along the line of travel, the sprockets being operable to engage the apertures to constrain said apertures to said line of travel.

13. The single-pass color printer of claim 12, wherein the first and second drive means each impart a force to the media having a first component oriented generally in a direction of media travel along the transport path and a second component in a direction away from the media edge.

14. The single-pass color printer of claim 12, the maintaining means includes means for biasing the media into engagement with the sprocket means.

15. The transport apparatus of claim 6, the drive means including a pair of elongate drive rollers extending across and forming an angle less than 90 degrees with the transport path, the drive rollers being mounted substantially parallel to one another and spaced for receiving the media therebetween.

16. The transport apparatus of claim 6, the media being of the type having spaced apertures formed adjacent the constrained periphery, the constraining means including a sprocketed roller for engaging the spaced apertures.

17. The transport apparatus of claim 6, including means for monitoring the opposing periphery to detect transverse media variations along the transport path.

18. The transport apparatus of claim 17, the monitoring means including optical sensing means mounted to be located proximate the opposing periphery as the media travels the transport path.

19. Transport apparatus for a printer-plotter having plural print heads arranged successively along a transport path for a single-pass printing of an image on a print media, the transport apparatus comprising:

means, mounted to the transport path, for constraining one periphery of the print media along a predetermined line of travel of the transport path;

a plurality of separately controllable drive means for moving the print media along the transport path by imparting a first force to the print media in the direction of media travel while imparting a second force in a direction generally transverse the direction of media travel, parallel the media surface, and away from the constrained periphery, a first one of said drive means being positioned at an input location of a first one of said print heads, the remaining ones of said drive means being positioned at an output location of each print head, said first one of said drive means being operable as an entry drive for the first print head, a last one of said drive means being operable as an exit drive for a last one of said print heads, the remaining ones of said drive means simultaneously being operable as an exit drive of an immediately preceding print head and as an entry drive of an immediately succeeding print head;

a plurality of tension monitoring means, engageable with said print media, for providing a tension signal indicative of a print media tension as the print media moves between said drive means; and control means, coupled to each said drive means, for providing drive signals in response to receipt of said tension signals to maintain said print media tension within a predetermined range between each said drive means.

* * * * *